United States Patent Office 3,195,993
Patented July 20, 1965

3,195,993
EPOXY RESIN COATED ABRASIVE
Matthew T. Gladstone, Scotia, N.Y., assignor to Norton
Company, Troy, N.Y., a corporation of Massachusetts
No Drawing. Filed June 21, 1961, Ser. No. 118,536
5 Claims. (Cl. 51—298)

This invention relates to resinous polymers derived from polymeric epoxy compounds of the type represented by the following structure:

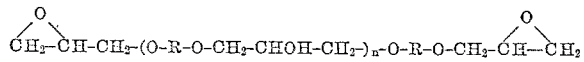

where $n$ is an integer and R is the radical of a dihydric phenol such as bis(4-hydroxyphenyl)-2,2-propane. Such epoxy resins are obtained by the reaction of bis-phenols or other polyhydroxyphenols with epichlorohydrin. Examples of the production of such resins are given in U.S. Patents 2,444,333; 2,500,600; 2,512,996; 2,528,360; and 2,528,417.

The epoxy resins are thermoplastic materials and in most applications must be further polymerized or cross linked by the addition of a catalyst or hardening agent. Commonly used cross linking agents or hardeners are polyamine compounds such as diethylene triamine, paraphenylenediamine, and the like. However, such hardeners, when added to epoxy resins commence reacting immediately even at room temperature and even more rapidly at 100° F., causing the viscosity to increase rapidly. Such rapid variation of viscosity may be intolerable in many manufacturing operations, and inconvenient in others due to the short pot life or shelf life of the composition.

An object of this invention is to provide an adhesive composition of the epoxy type of good strength, flexibility, and toughness in its cured state, but having good stability or pot life at room temperature and above, while being capable of rapid cure at relatively moderate temperatures.

Another object of this invention is to provide an improved flexible coated abrasive sheet comprising a cured epoxy resin as the grit bonding or sizing adhesive.

I have found that by reacting suitable polyamines with certain hydroxy carbonyl compounds or with compounds which react to form such hydroxy carbonyl compounds, a hardener for epoxy resins is obtained which produces a composition having good viscosity stability over a wide temperature range but which will cure at elevated temperatures to a tough, flexible resin having properties particularly suitable for the manufacture of coated abrasives.

The hydroxy carbonyl compounds useful in my invention have the following structure:

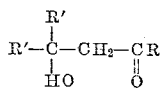

where R represents a hydrogen atom or an alkyl radical containing from one to four carbon atoms; and where R' represents an alkyl radical containing from one to four carbon atoms or a hydrogen atom, with at least one R' group being an alkyl radical.

The polyamines found to be useful in my invention are aliphatic polyamines containing not less than four carbon atoms and including at least two amino groups which may be either primary or secondary.

In addition to hydroxy ketones such as are indicated above as useful in my invention, compounds which will condense to form such compounds are also useful in my invention. For example, acetone and acetaldehyde can react as follows:

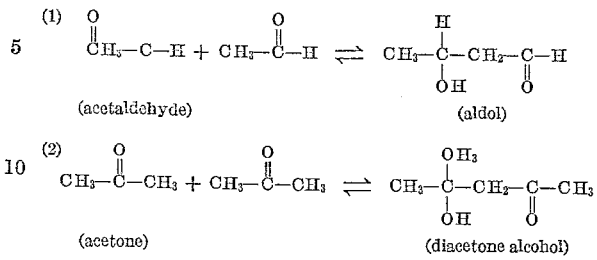

I find that best results can be achieved by adding the hydroxy-carbonyl compound or hydroxy-carbonyl forming material to the polyamine in a ratio of one mole of hydroxy-carbonyl or potential hydroxy carbonyl (e.g. two moles of acetone) for each primary or secondary amino nitrogen in the polyamine.

Although I may use less of the hydroxy-carbonyl compound for example 2 moles of diacetone alcohol to 1 mole of diethylene triamine, in forming the polyamine complex and still produce good results, the best results in terms of stabilization are obtained by using the above ratio.

The amine-hydroxy carbonyl complexes are formed by simply slowly adding with stirring the hydroxy-carbonyl or hydroxy-carbonyl former to the polyamine. Although effective results can be obtained by adding the amine to the hydroxy-carbonyl, the most effective results are formed by the reverse addition. Compounds of this type are described in U.S. Patent No. 2,680,137.

The following table gives examples of useful complexes which are exemplary of the complex latent curing catalysts of my invention:

| Hydroxy-Ketone Source | Amine | Molal Ratio of Hydroxy-Ketone or Hydroxy-Ketone Source to Amine |
| --- | --- | --- |
| Aldol | Diethylenetriamine | 3/1 |
| Acetone | do | 6/1 |
| Diacetone Alcohol | do | 3/1 |
| Do | Triethylenetetramine | 4/1 |
| Do | 3,3' Aminobispropylamine | 3/1 |
| Do | Aminoethylethanolamine | 2/1 |
| Do | Methylamino-ethylethanol-amine (di-secondary) | 2/1 |

In using the latent curing catalyst complex of my invention, I add it to the epoxy resin in any suitable solvent to adjust the viscosity to whatever value desired depending upon the particular application involved. I have found that a 1:1 mixture of diacetone alcohol and xylene or a 1:1 mixture of the acetic acid ester of ethylene glycol monoethyl eether and xylene are suitable solvents. To cure the composition, heating for 30 minutes at 275° F. produces satisfactory results.

The resin catalyst compositions of my invention may be used in many and varied applications in which epoxy resins are generally used. However, I have found that the resulting physical properties of the resins cured according to my invention are particularly appropriate to the manufacture of coated abrasives. The resins are of use as abrasive bonding media, presizes, or grain sizes.

Suitable epoxy resins which may be advantageously catalyzed by the latent curing catalyst of my invention of epoxy resins are sold by the Shell Chemical Company under the trademarks Epon 1001, Epon 1004, Epon 1007, and Epon 1009, where the material is used as an abrasive bond.

A series of epoxy resins similar to those obtainable commercially from Shell may be prepared as follows:

EPOXY RESIN—EXAMPLE I 228 grams of Bisphenol–A are dissolved in 2 molecular weights of caustic soda in the form of a 15% solution. The solution is heated to 150° F. and 185 grams of epichlorohydrin are added drop-wise over a period of one hour at this temperature with continuous stirring. At first a very soft resin is formed which becomes less soft with time. At the end of the period of one hour the resin should be washed repeatedly with lukewarm water until substantially free from chlorides. Alternatively, the resin may be dissolved in acetone and the deposited salts separated by filtering. The resin is then freed from water and also from solvent, if solvent, such as acetone, has been added. This is accomplished by the combined use of the usual mechanical separation processes and a vacuum evaporating process, the vacuum evaporating process being desirable in order to remove the last traces of both water and solvent. The resin so prepared should be of a light yellowish color with a melting point of about 167° F. and an epoxide equivalent of from 450 to 525.

EPOXY RESIN—EXAMPLE II

Another satisfactory epoxy alcohol is prepared by reacting 1.33 mols of epichlorohydrin with 1 mol of Bisphenol-A in the presence of 1.37 mols of sodium hydroxide in the form of a 9% aqueous solution. This solution in a reaction vessel fitted with a stirrer is heated to about 115° F. whereupon the epichlorohydrin is rapidly added while agitating the reaction mixture. In about 50 minutes the temperature of the reaction mixture, without application of external heat, rises to its maximum produced from the heat of reaction, but the temperature then gradually falls back to the starting temperature of 115° F. As the reaction proceeds, the mixture separates into a two-phase system consisting of an aqueous phase and a molten taffy-like resin phase. About 80 minutes after the epichlorohydrin is added the aqueous layer is removed and the molten resin is washed continuously with hot water until the wash water is neutral to litmus. Then the water is drained from the resin, and the resin heated to about 280° F. with agitation until dry. The molten resin is cooled and flaked. The resulting resin has a melting point of 212° F. and an epoxide equivalent of about 950.

EPOXY RESIN—EXAMPLE III

Another polymeric epoxy alcohol suitable for use in this invention and having a higher molecular weight and softening point than those of Examples I and II above, is prepared by reacting the resin obtained as described in Example II with an added 6% of Bisphenol–A. A portion of the resin of Example II is melted and heated to 300° F. whereupon the 6% by weight of Bisphenol–A is mixed therewith. The reaction mixture is then heated so as to gradually increase the temperature thereof to 375° F. in 25 minutes which temperature is maintained for an additional 1½ hours to complete the reaction. The resin is cooled and flaked.

The resulting resin has a melting point of 268° F. and an epoxide equivalent of about 1800.

EPOXY RESIN—EXAMPLE IV

Still another polyhydric epoxy alcohol suitable for use in this invention and having a higher molecular weight and softening point than those of Examples I, II, and III above, is prepared by reacting the resin obtained as described in Example III with an added 3% of Bisphenol–A. Heat is applied, and at 325° F. the mixture is partially melted. Stirring is initiated at this point and the temperature raised to 360° F. It is held at 360–400° F. for 1 hour of which 35 minutes is between 375–400° F. to complete the reaction. The resin is cooled and flaked.

The resulting resin has a melting point of 297° F. and an epoxide equivalent of from 2400 to 4000.

In Examples I, II, III and IV, epichlorohydrin is used in making the polyhydric epoxy alcohols but there may be used in lieu of epichlorohydrin either epibromohydrin or epiiodohydrin as understood in the art.

Likewise, Bisphenol–A is used in making the polymeric epoxy alcohols of Examples I, II, III and IV, but in lieu of Bisphenol–A, other polyhydric phenols having analogous chemical structures may be used as is understood in the art.

EXAMPLE V.—PREPARATION OF CATALYST COMPLEX-DIACETONE ALCOHOL-DIETHYLENE TRIAMINE

Approximately 125 cc. diacetone alcohol (1 mol) in a separatory funnel is added dropwise to a beaker containing 35.9 cc. (0.33 mol) diethylene triamine over a 15 minute period. An exothermic reaction develops at the interface of the two layers which form by this addition. This two phase system is then allowed to stand for a period of approximately 15 hours at room temperature (77° F.) after the addition is complete, at which time the two layers are stirred together forming a homogeneous solution of the diacetone alcohol-diethylene triamine complex.

The preferred ratios of amine to alcohol in the complex vary from 1:4 to 1:2. As a general criterion one mol of diacetone alcohol is added for each primary or secondary amino nitrogen atom in the aliphatic polyamine when forming the catalyst complex.

EXAMPLE VI.—PREPARATION OF CATALYST COMPLEX—3,3' AMINO BISPROPYL AMINE-DIACETONE ALCOHOL

Diacetone alcohol is added dropwise to 3,3' amino bispropyl amine over a 15–20 minute period to form the amine complex. Approximately 125 cc. (1 mol) of the alcohol is added to 54 cc. (0.3 mol) of the amine. As the alcohol is added to the amine an exotherm develops and external cooling assists in the control of the reaction, particularly at the initial stages of addition when the two layers are formed. The mixture, as a two phase system, is allowed to stand overnight and preferably for a period of 20 hours. The system becomes homogeneous on stirring.

EXAMPLE VII.—PREPARATION OF CATALYST COMPLEX — DIETHYLENE TRIAMINE - ALDOL (B-HYDROXYBUTYRALDEHYDE)

In the formation of the diethylene triamine-aldol complex, 80.6 cc. aldol (1 mol) is added with caution from a separatory funnel to a beaker containing 35.9 cc. (0.33 mol) diethylene triamine over a 30 minute period. The reaction between the alcohol and the amine involves a high exotherm and external cooling is essential for a control of the reaction. As in the prior examples a two phase system results which becomes homogenous with stirring. After the formation of the complex is completed, it is preferred that the reaction product be allowed to stand for a 24 hour period at room temperature before use.

The total properties of a cured resin of this invention are such that the cutting efficiency of an abrasive sheet employing the resin to hold the abrasive grains is high as compared with typical products of prior art. Properties such as tensile strength, adhesion to backing, resistance to tear and resistance to bending, are important and a measure of the suitability of the resin. But the suitability of a resin cannot be entirely determined by such physical measurements as are presently available. The real test is actual comparison of the cutting efficiency of the finished abrasive sheet. In such comparison, the resins of my invention produce superior results.

Having described specific examples of useful epoxy resins and a catalyst, I will now describe specific examples of coated abrasive products made with the adhesive system of my invention.

EXAMPLE VIII.—COATED ABRASIVE—EMPLOYING EPON+DIACETONE ALCOHOL-DIETHYLENE TRIAMINE CATALYST ADHESIVE SYSTEM—MAKER AND SIZE

In the manufacture of waterproof sandpaper I employ as a backing a rubber impregnated paper in which 30–33% rubber has been added to a 35–36 lb. kraft paper by a saturation procedure after the formation of the paper web to yield a saturated paper of approximately 54 lbs. In order to prepare the backing to receive the maker coat of adhesive it is treated on the coat side with a barrier or presizing coat of a copolymer comprising a blend of vinyl chloride and butadiene acrylonitrile rubber in the form of a latex. This presizing layer is applied to the paper on the felt side with the aid of a blade at room temperature and dried at any convenient temperature until tack-free. This backing then contains about 0.8 lb./sandpaper ream of presizing solids.

The presized paper backing is then back saturated with a phenolic resin to improve the strength and water-resistance of the backing. This backsize is applied to the wire side of the paper at 145° F. The sized paper is then cured for 4 hours at 190° F. Curable contents of the backsizing solution of about 0.6 lb./sandpaper ream are usually satisfactory.

The paper is removed from the drying room in the form of a roll and mounted on the paper holding means of a conventional sandpaper machine on which adhesive is applied to the backing by means of a sandpaper calender roll coating apparatus used in a manner to produce a 20% slip roll effect. The adhesive used consists of the adhesive of Example No. I catalyzed with the diacetone alcohol-diethylene triamine complex of Example V in such preparation that 7 grams of the amine are available for each 100 grams of the Epon resin.

The adhesive at approximately 58% solids containing the catalyst complex is placed in the adhesive-heating apparatus of the sandpaper machine and brought to a temperature of about 100° F. The adhesive may be applied to the extent of about 1.3 lbs./sandpaper ream to the prepared backing, previously described, after which 3.8 lbs./sandpaper ream of grit 320 silicon carbide is applied to the making coat of adhesive on the backing by conventional means. I have found the electrostatic methods disclosed and claimed in U.S. Patent 2,318,570 highly efficient in the application of the grains. The web coated with the making coat of adhesive and abrasive grains is then moved into a conventional sandpaper drying room and heated at about 190° F. for 4 hours to cure the binder.

After the binder has been so cured, the abrasively coated web is moved through a conventional sandpaper sizing machine where the sizing coat of adhesive is added. In this example the sizing coat of adhesive is the same as the maker. The size may be applied in the conventional apparatus at a temperature of about 100° F.

The amount of size added is controlled partly by weight but, to a greater extent, by the ability of a skilled operator to judge the size. Curable contents of a sizing solution of about 2 lbs./sandpaper ream are usually adequate. After this sizing operation the web is again passed into a conventional sandpaper drying room and heated to cure the resin. A satisfactory cure of the binder after the sizing operation may be obtained by heating for about 4 hours at 220° F., but those skilled in the art will appreciate that a number of variations may be made in the time and temperature of the curing cycle. At the time that the sizing coat is applied, by a separate set of calender rolls, arranged to apply a backsize to the web, I apply a backsizing material for increasing the friction of the backing in use. Suitable backsizes for this purpose are disclosed in U.S. 2,219,278.

The backsize is applied in the form of a very thin coating so that the web may be hung, while the backsizing is wet, on conventional sandpaper slats for curing. Normally this backsize coating and the size adhesives are cured at the same time and as indicated for the curing of the sizing coat of adhesives.

EXAMPLE IX.—COATED ABRASIVE—EMPLOYING EPOXY ESTER MAKER WITH AN EPON+DIACETONE ALCOHOL-DIETHYLENE TRIAMINE CATALYST SIZE ADHESIVE

In this example, waterproof sandpaper is manufactured having a making adhesive containing an epoxy ester varnish cross-linked by a manganese naphthenate drier and sized with the Epon resin of Example I, catalyzed with diacetone-alcohol-diethylene triamine catalyst.

The paper backing and subsequent treatment are substantially the same as that described in Example VI above.

The maker adhesive is prepared by incorporating wood rosin at the time the esterifying reaction between the Epon resin of Example II and the oil acid of linseed oil is carried out. A hot plate is connected with a Variac and preheated to minimize the time of bringing the reaction mass to the optimum initial reaction temperature of 440° F. At the end of the preheating period 129 parts finely divided resinous Epon constituent of Example II, 141 parts linseed oil fatty acids and 30 parts N-wood rosin is placed on the hot plate. A suitable grade of distilled linseed oil fatty acids has been obtained commercially from Spencer Kellogg & Sons Inc., Buffalo 5, New York. The flask is equipped with a nitrogen delivery tube, thermometer, air cooled condenser and a stirrer. When the temperature reaches 240° F. the stirrer is started within 45 minutes the temperature reaches 440° F. to 480° F. and is held within this temperature range for the reaction period. When the reaction mass shows an acid number of 12, usually within a period of from 2 to 4 hours, the current is turned off and the mass allowed to cool in the flask on the plate. When the temperature reaches 350° F. the resin is reduced to 70% solids by the addition of mineral spirits. This solution should have an acid number of about 4 and a viscosity of about 117 cps. at 150° F. This product is then thinned with 30.5 lbs. xylene for each 100 lbs. resin.

Each 100 lbs. resin solution containing approximately 58% solids is thoroughly mixed with 203.75 cc. of a 3% solution of manganese naphthanate drier.

The adhesive so prepared is placed in the adhesive-containing means of a sandpaper making machine, and brought to a temperature of about 150° F. The web of paper is passed through the machine and a making coat of adhesive to the extent of about 1.2 lbs. per sandpaper ream of adhesive solution is coated thereon by means of the calender rolls of the machine.

The web then continues its passage through a grain-applying means where an abrasive grain coating of 3.3 lbs. per sandpaper ream of grit 320 silicon carbide is attached to the adhesive coating. A preferred means of applying the grains is one of the electrostatic methods such as those described in U.S. Patent 2,318,570.

The web with the grain attached is then passed into a conventional sandpaper drying room where the web is dried and cured to set the adhesive so as to retain the grains properly in the sizing operation. A satisfactory curing cycle is 7½ hours at 165° F., ½ hour at 165° F. to 192° F. (the temperature is rising during this period) and four hours at 190° F.

After the making coat is so cured the web is passed through a sandpaper sizing machine where a sizing coat of adhesive is applied in the usual way at a temperature of about 100° F. The adhesive of this example utilized for sizing purposes is the Epon described in Example I catalyzed with the diacetone alcohol-diethylene triamine complex of Example V in a proportion of 100 grams of resin to 7 grams of available amine. The size adhesive is applied at 58.5% solids with a viscosity of 110 cps. at 100° F. After the sizing operation in which about 4.6 lbs. per sandpaper ream of the solution are applied over the grain, the web is again passed into a conventional sandpaper drying room and dried and heated to cure the adhesives. A satisfactory curing cycle for the sized product is about 4½ hours at 220° F.

At the time the sizing coat is applied by a separate set of calender rolls arranged to apply a backsize to the web, we apply a backsizing material for increasing the friction of the backing in use. Suitable backsizes for this purpose are disclosed in U.S. 2,219,278. The backsize is applied in the form of a very thin coating so that the web may be hung, while the backsizing is wet, on conventional sandpaper slats for curing. The curing of the backsizing adhesive and the grit size occurs simultaneously at the times and temperatures indicated above.

When the cutting quality of the coated abrasives made according to Examples of VIII and IX is compared with that of a typical commercial waterproof product the following results were obtained:

Table 1

| | Flat sanding test, primer coated metal (percent cut) |
|---|---|
| Example VIII | 138 |
| Example IX | 120 |
| Control (standard product of prior art) | 100 |

In addition to the improved cut obtained with the above examples, the products show a marked improvement in resistance to tear as compared with comparable commercial products of the prior art. The improved characteristics of these products appear to be attributable solely to the use of the improved adhesive system of this invention.

The improved resin-catalyst system disclosed herein, although particularly useful in manufacturing coated abrasives, as in the above examples, may also be used in other applications such as adhesives, protective coatings, foamed products and other uses where the superior properties of epoxy resins in conjunction with the improved stability and pot life provided by this invention are desirable.

"Epoxy equivalent" as referred to herein is the number of grams of epoxy resin containing one gram equivalent of epoxide.

I claim:

1. A heat curable adhesive composition stable at room temperature, comprising an epoxy ether having an epoxy equivalent of from 450 to 4000 and from 1 to 10% by weight of amine from the reaction product of (1) a hydroxy-carbonyl compound of the structure:

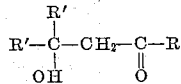

where R and R' are selected from the group consisting of a combined hydrogen atom and methyl, ethyl, propyl and butyl radicals, and where at least one R' represents an alkyl group, and (2) an aliphatic polyamine containing not less than four carbon atoms and including at least two amino groups selected from the group consisting of primary and secondary amino groups.

2. A heat curing composition as in claim 1 wherein the ratio of hydroxy-carbonyl compound to the amine is one mol of hydroxy-carbonyl compound for each primary and each secondary amino group in the amine.

3. A coated abrasive sheet comprising a flexible backing member having abrasive grains bonded thereto by an adhesive which is the heat cured reaction product of an epoxy ether having an epoxy equivalent from 450 to 4000 and from 1 to 10% by weight of amine from the reaction product of (1) a hydroxy-carbonyl compound of the structure:

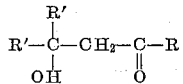

where R and R' are selected from the group consisting of a combined hydrogen atom and methyl, ethyl, propyl, and butyl radicals, and where at least one R' represents an alkyl group, and (2) an aliphatic polyamine containing not less than four carbon atoms and including at least two amino groups selected from the group consisting of primary and secondary amino groups.

4. A coated abrasive sheet comprising a flexible backing member, abrasive grains bonded thereto by a maker coat of adhesive, and a size coat of adhesive overlying said maker coat consisting essentially of the reaction product of an epoxy ether having an epoxy equivalent of from 450 to 4000 and from 1 to 10% by weight of amine from the reaction product of (1) a hydroxy-carbonyl compound of the structure:

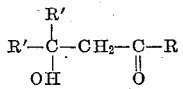

where R and R' are selected from the group consisting of a combined hydrogen atom and methyl, ethyl, propyl, and butyl radicals, and where at least one R' represents an alkyl group and (2) an aliphatic polyamine containing not less than four carbon atoms and including at least two amino groups selected from the group consisting of primary and secondary amino groups.

5. A coated abrasive sheet as in claim 4 wherein said maker coat of adhesive is an ester of an epoxy resin and tall oil fatty acids and wherein said amine component of said reaction product forming said size coat of adhesive is formed as the reaction product of diacetone alcohol and diethylene triamine.

References Cited by the Examiner

UNITED STATES PATENTS

| 2,322,156 | 6/43 | Oglesby | 51—298 |
| 2,347,662 | 5/44 | Carlton et al. | 51—298 |
| 2,585,115 | 2/52 | Greenlee | 260—47 |
| 2,819,233 | 1/58 | Smith et al. | 260—47 |
| 2,824,851 | 2/58 | Hall | 51—298 |
| 2,862,806 | 12/58 | Nestor | 51—295 |
| 2,865,886 | 12/58 | Greenlee | 260—47 |
| 2,935,488 | 5/60 | Phillips et al. | 260—2 |

ALEXANDER H. BRODMERKEL, Primary Examiner.

JOHN R. SPECK, MORRIS LIEBMAN, Examiners.